March 8, 1927.

N. A. CHRISTENSEN 1,619,970

VEHICLE BRAKE MECHANISM

Filed Nov. 22, 1924    2 Sheets-Sheet 1

INVENTOR.
NIELS A. CHRISTENSEN.
BY
*Quarles & French*
ATTORNEYS

March 8, 1927.
N. A. CHRISTENSEN
1,619,970
VEHICLE BRAKE MECHANISM
Filed Nov. 28, 1924
2 Sheets-Sheet 2
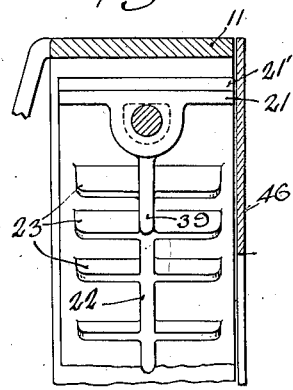
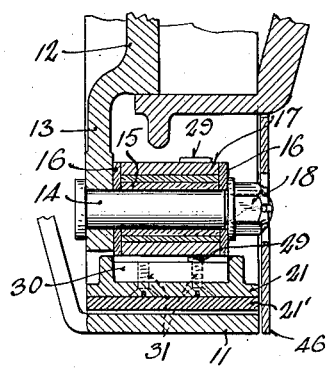
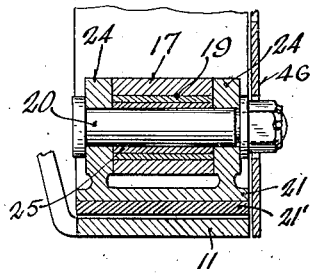
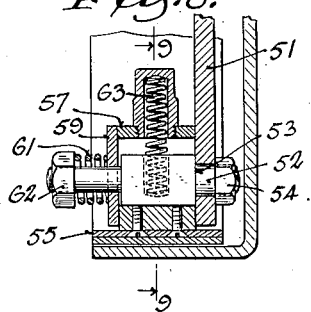
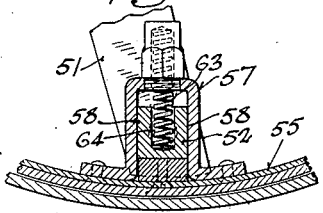
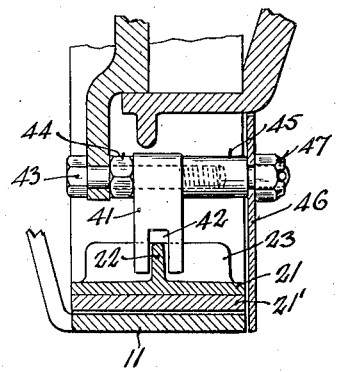
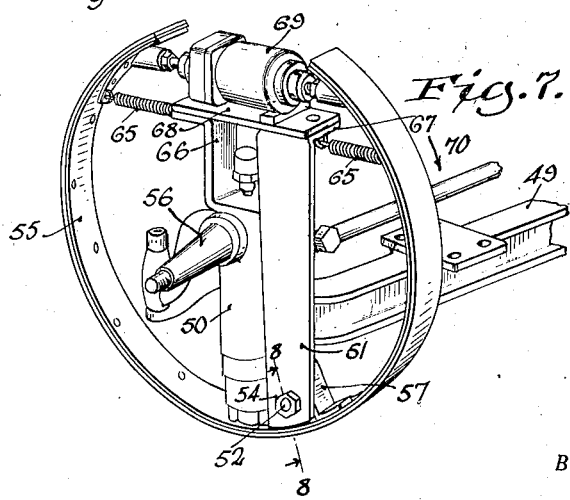
INVENTOR.
NIELS A. CHRISTENSEN
BY
ATTORNEYS.

Patented Mar. 8, 1927.

1,619,970

UNITED STATES PATENT OFFICE.

NIELS A. CHRISTENSEN, OF MILWAUKEE, WISCONSIN.

VEHICLE BRAKE MECHANISM

Application filed November 28, 1924. Serial No. 752,681.

The invention relates to vehicle brakes for automotive vehicles and trailers for said vehicles.

For efficient operation of brake shoes where the shoe is moved into braking engagement with the drum by a fluid-pressure-operated motor, the pressures on the brake shoe on opposite sides of the anchor pin should be balanced to allow free movement of the anchor pin and I find that this result is attained by locating the anchor pin to one side of the center line of the shoe so that that part of the shoe between said anchor pin and the end of the shoe and adjacent the forwardly moving part of the brake drum subtends a lesser arc than the other part of the shoe cooperating with the trailing side of the brake drum. Thus, by offsetting the anchor pin at a slight angle sufficient to make up for the difference in pressure between the self-application and drag of the parts of the shoe and toward the forwardly moving part of the brake drum, I am able to balance the pressures on the anchor pin, leaving it more free to move outwardly during the application of braking pressure, with the result that the whole shoe moves uniformly into braking engagement with the drum so that an efficient braking effect is secured.

A further object of the invention is to provide an anchorage connection having the advantage above described, including an anchor pin link and means for adjustably limiting the release position of the shoe.

When brakes are applied to fast moving automotive vehicles there is a pronounced heating by the friction produced between the shoe and the drum, and a further object of the invention is to provide a brake shoe with a relatively large radiating surface so as to prevent the shoe from heating and yet not hinder the flexing of the shoe.

A further object of the invention is to provide an improved brake construction in which the brake member is of band form secured intermediate its end to a link associated with a support.

The invention further consists in the several features hereinafter described and more particularly defined by claims at the conclusion hereof.

In the drawings: Fig. 1 is an elevation view of brake apparatus embodying the invention;

Fig. 3 is a detail sectional view taken on the line 3—3 of Fig. 1;

Fig. 4 is a detail sectional view taken on the line 4—4 of Fig. 1;

Fig. 5 is a detail sectional view taken on the line 5—5 of Fig. 1;

Fig. 6 is a detail sectional view taken on the line 6—6 of Fig. 1;

Fig. 7 is a perspective view of another brake mechanism embodying an offset anchor pin;

Fig. 8 is a detail sectional view taken on the line 8—8 of Fig. 7;

Fig. 9 is a detail sectional view taken on the line 9—9 of Fig. 8.

Figure 1:
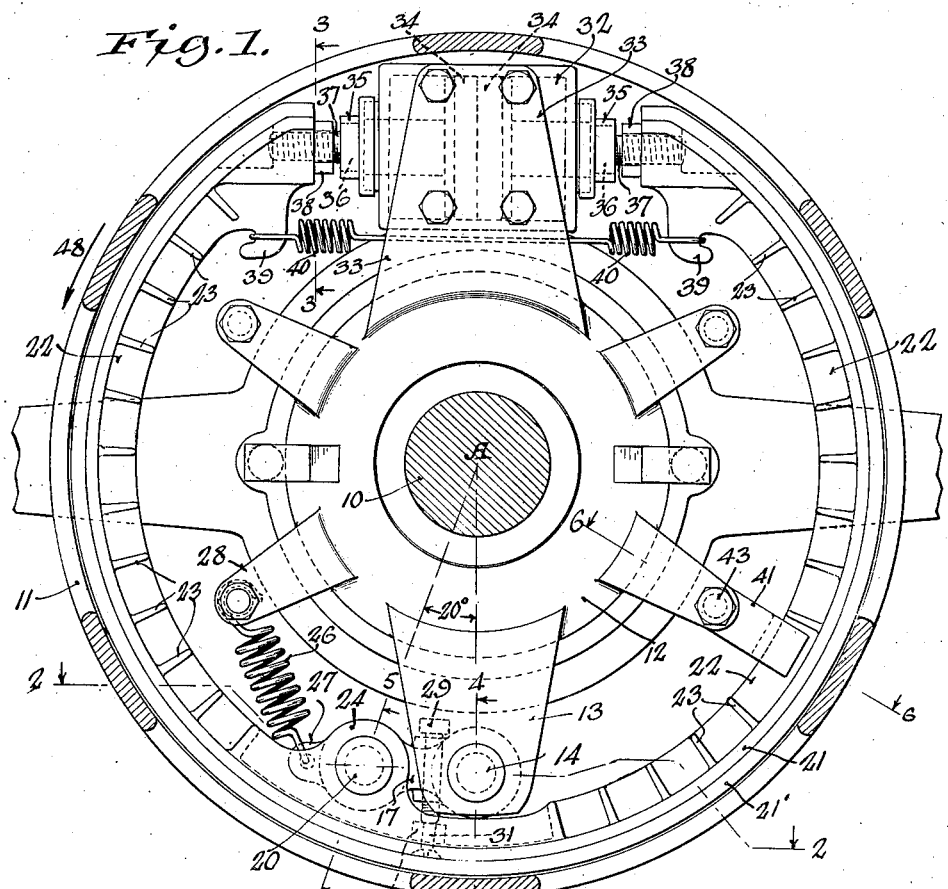
Figure 2:
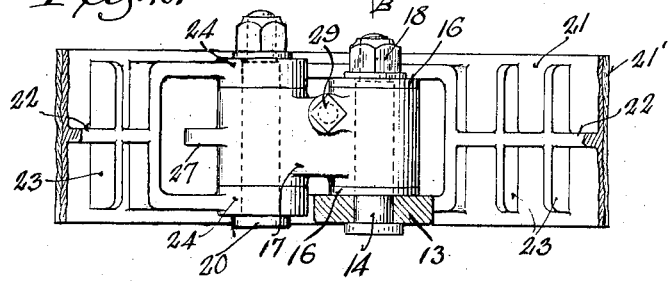
Fig. 2 is a detail sectional view taken on the line 2—2 of Fig. 1.

Referring to Figs. 1 to 6, inclusive, the numeral 10 designates the wheel shaft on which the wheel carrying the brake drum 11 is mounted. A supporting member 12, which is secured to the axle support in a known manner, has an arm 13 carrying a bolt 14. A bushing 15 is mounted on the bolt 14 between washers 16, and one of the bushed ends of an anchor pin link 17 is pivotally mounted on said bushing between the washers. The bushing 15 acts as a spacer for the washers as well as a bearing for the link, and a nut 18 on the bolt holds the parts in assembled position, Fig. 4. The other end of the link 17 has a bushed bearing 19 receiving the anchor pin 20.

The brake member or shoe 21, with the usual brake lining 21', in the form of a cast metal band, has an internal annularly extending strengthening rib 22 and a plurality of radially disposed heat radiating fins 23 extending from the sides of the band to said rib. These fins provide a large heat-radiating surface for effecting a rapid cooling of the brake shoe, but being transverse to the band they do not interfere with its radial flexibility. The shoe has ears 24 apertured to receive the anchor pin 20 and a spacing bushing 25 is preferably mounted on said pin between the ears and the bushed bearing 19 of said pin.

The medial portion of the shoe is yieldingly held in a release position by means of a spring 26 secured at one end to a lug 27 on the link 17, and at its other end to a pin on an arm 28 on the support 12, and the release position of this medial portion is determined by an adjustable stop screw 29 carried by the link 17 adjacent the bolt 14 and engageable, by the action of the spring 26, with a hardened steel stop block 30 secured in any suitable manner, as by screws 31, to the inner face of the shoe.

The brake member is moved into braking engagement with the drum by means of a fluid-pressure-operated motor including a brake cylinder 32 secured to an arm 33 on the support 12 and having a pair of opposed suitably packed pistons 34 working therein whose piston rods work through the ends of said cylinder and have enlarged headed ends 35, exterior of the cylinder, slotted to receive the flat-sided heads 36 of jackscrews 37 which are adjustably secured in threaded engagement with the free ends of the band to determine the release position of the band, and held in adjusted position by locknuts 38.

The free ends of the band have hooked projections 39 to form anchors for a release spring 40 which cooperates with the spring 26 to move the band out of braking engagement with the drum.

While the link 17 and its associated parts and the tongue and groove connection between the heads 35 and 36 serve to hold the band against lateral movement relative to the drum, as an additional means for this purpose I have provided a guide member 41 slotted at 42 to fit over the rib 22 and secured to the support 12 by means of a bolt 43, spacing nut 44 and socket bolt 45 whose threaded socket receives the threaded outer end of said bolt 43 and whose threaded shank extends through an opening in a cover plate 46 and receives a clamping nut 47.

The brake shoes and links 17 are reversible so that they may be used on either left or right hand wheels.

From Fig. 1 it will be noted that the center of the anchor pin 20 is offset from the center line A—B of the shoe, the angles B A C representing this offset being about 20 degrees and the offset being in the direction of that part of the brake drum which is rotating toward the medial part of the band, that is, in the direction of the arrow 48 which represents the direction of forward travel of the wheel. Thus, the arc subtended by that part of the shoe in front of the anchor pin 20 is less than that subtended by that part of the shoe back of said pin, and I find that, by using this offset, when a brake application is made by admitting compressed air between the pistons and thereby moving the band into braking engagement with the drum that the pressures along the shoe at opposite sides of the anchor pin become substantially equalized, because the lesser brake surface on the advancing side of the shoe is augmented by the tendency of that side of the shoe to apply itself because of the direction of rotation of the drum during the forward travel of the vehicle. This equalization of braking pressure along the shoe causes it to engage the drum uniformly because the pressures on the anchor pin are equalized and hence an efficient braking effect is secured.

In Figs. 7, 8 and 9, I show a brake mechanism associated with a front axle 49 and steering knuckle 50 and employing an offset anchor pin. In this construction a supporting plate 51 is welded to the steering knuckle 50 and the anchor pin 52 is bolted thereto at an angle of about twenty degrees with the vertical by having said plate clamped between a shoulder 53 on said pin and a nut 54.

The brake band 55 cooperates with a brake drum for the front wheel, not shown, turning on the wheel spindle 56, similar to the drum 11, and has a yoke 57 secured thereto whose flat sides slidably engage the flat sides 58 of the pin 52, said yoke being yieldingly held against lateral movement by a plate 59, spring 61 and nut 62. A spring 63 seated in a bore 64 in said pin bears at its other end upon the transverse portion of the yoke so as to urge the medial portion of the band to a release position. The free ends of the band are normally held in release position by springs 65, each secured at one end adjacent the end of the band and one secured at its other end to the arm 51, while the other is secured at its other end to a support 66 also welded to the steering knuckle 50.

The arm 51 has an angled portion 67 and a brake cylinder supporting plate 68 is secured thereto and to a part of the support 66. The fluid-pressure-operated motor 69 is similar to that previously described and similarly associated with the ends of the shoe or band so that when pressure fluid is introduced between the piston the band is moved into braking engagement with the drum on the front wheel in a manner similar to that of the band 21. The anchor pin 52, it will be noted, is offset forwardly from the steering knuckle and toward the front, the arrow 70 indicating the direction of rotation of the front wheel when traveling in a forward direction, this offset being for the purpose set forth in connection with the first-described construction.

I desire it to be understood that this invention is not to be limited to any particular form or arrangement of parts except in so far as such limitations are specified in the claims or necessitated by the prior art.

What I claim as my invention is:

1. In brake mechanism of the character described, the combination with the rotatable brake drum, of an internal expanding brake band engageable with said drum, supporting means for said band including an anchor pin link and an anchor pin offset by said link from the center line of the band toward the advancing side of the drum for the purpose described, fluid-pressure-operated means to move said band into braking engagement with said drum, means to release said drum, and adjustable means on said link engageable with said band determining the release position of the medial portion of the band.

2. In brake mechanism of the class described, the combination with the rotatable brake drum, of an internal expanding brake band engageable with said drum, supporting means for said band including an anchor pin link and an anchor pin offset by said link from the center line of the band toward the advancing side of the drum for the purpose described, fluid-pressure-operated means operatively connected with the free end portions of the band to move it into braking engagement with the drum, spring means connected to said end portions to release them from engagement with said drum, spring means associated with said link to release the medial portion of the band from said drum, and an adjustable stop on said link determining the release position of the medial portion of said band.

3. In brake mechanism of the class described, the combination with the rotatable brake drum, of an internal expanding brake band engageable with said drum, supporting means for said band including an anchor pin link and an anchor pin connecting said link with an intermediate part of said band, an adjustable stop on said link engageable with the medial portion of the band to determine its release position, spring means for moving said band against said stop, fluid-pressure-operated means operatively connected to the free end portions of the band to move it into braking engagement with said drum, and spring means associated with the end portions of said band to release them from engagement with said drum.

4. In brake mechanism of the class described, the combination with the rotatable brake drum, of an internal expanding brake band engageable with said drum, supporting means for said band including an anchor pin link and an anchor pin connecting said link with an intermediate part of said band, brake release spring means associated with the intermediate portion of said band, means for limiting the inward movement of the medial part of said band, means associated with the free end portions of the band to move it into braking engagement with said drum, and spring means associated with the end portions of the band to release them from engagement with said drum.

5. In vehicle wheel brake mechanism, the combination with the rotatable brake drum, of an internal expanding brake member engageable with said drum, supporting means for said brake member including an anchor pin link and an anchor pin connecting said link with an intermediate part of said brake member, means for limiting the inward movement of the medial part of said brake member, means associated with the free end portions of the brake member to move it into braking engagement with said drum, and means to release said brake member from said drum.

In testimony whereof, I affix my signature.

NIELS A. CHRISTENSEN.